(12) United States Patent
Stachura et al.

(10) Patent No.: US 8,151,536 B2
(45) Date of Patent: Apr. 10, 2012

(54) PANEL SUBSTRATES FOR VEHICLE FINISH PANELS AND VEHICLE FINISH PANELS INCORPORATING THE SAME

(75) Inventors: Jan-Michael Francis Stachura, Milan, MI (US); Warren Jing-Po Chou, Ann Arbor, MI (US); Jonathan Joseph Quijano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 284 days.

(21) Appl. No.: 12/427,143

(22) Filed: Apr. 21, 2009

(65) Prior Publication Data
US 2010/0264697 A1    Oct. 21, 2010

(51) Int. Cl.
 *E04C 2/38* (2006.01)
(52) U.S. Cl. .......... 52/716.5; 296/1.08; 296/70
(58) Field of Classification Search .......... 296/70, 296/1.08, 39.1, 191; 29/897.2, 897.3; 428/57, 428/58
See application file for complete search history.

(56) References Cited

U.S. PATENT DOCUMENTS

| | | | |
|---|---|---|---|
| 4,663,210 A | 5/1987 | Schreiber et al. | |
| 4,779,390 A * | 10/1988 | Repper et al. | 52/222 |
| 5,895,096 A | 4/1999 | Massara | |
| 5,997,076 A * | 12/1999 | Ehrlich | 296/186.1 |
| 6,377,695 B1 | 4/2002 | Azima et al. | |
| 6,601,909 B2 * | 8/2003 | Obara et al. | 296/191 |
| 6,635,328 B2 * | 10/2003 | Shimabara et al. | 428/71 |
| 7,100,958 B2 | 9/2006 | Ory | |
| 7,332,207 B2 | 2/2008 | Bondar et al. | |
| 2002/0153741 A1 | 10/2002 | Speelman et al. | |
| 2003/0175467 A1 | 9/2003 | Campbell et al. | |
| 2004/0140692 A1 * | 7/2004 | Grimm et al. | 296/191 |
| 2005/0248176 A1 | 11/2005 | Ory | |
| 2005/0253409 A1 * | 11/2005 | Sato et al. | 296/70 |
| 2006/0237988 A1 * | 10/2006 | Niimi | 296/70 |
| 2007/0018472 A1 * | 1/2007 | Michalski et al. | 296/1.08 |
| 2007/0148411 A1 | 6/2007 | Yamada | |
| 2008/0209955 A1 | 9/2008 | Cassaro et al. | |
| 2010/0264698 A1 * | 10/2010 | Stachura et al. | 296/191 |

OTHER PUBLICATIONS

Office Action mailed Oct. 7, 2011 as it relates to U.S. Appl. No. 12/427,220, received Oct. 12, 2011.

* cited by examiner

*Primary Examiner* — Jessica Laux
(74) *Attorney, Agent, or Firm* — Dinsmore & Shohl LLP

(57) ABSTRACT

A finish panel for a vehicle may include a panel substrate, a skin layer disposed over the panel substrate, and a foam layer. The panel substrate may include a base portion, an upper sealing surface and a lower sealing surface. The upper sealing surface and the lower sealing surface may be oriented in a step configuration. The skin layer may include an upper skin and a lower skin joined together to form a seam. The seam may include an overlap seam and at least a portion of the overlap seam may be positioned on the lower sealing surface such that there are no obtrusions in an A-surface of the skin layer. The foam layer may be disposed between the skin layer and the panel substrate.

20 Claims, 6 Drawing Sheets

PANEL SUBSTRATES FOR VEHICLE FINISH PANELS AND VEHICLE FINISH PANELS INCORPORATING THE SAME

CROSS REFERENCE TO RELATED APPLICATIONS

This application is related to U.S. Non-Provisional Application No. 12/427,220 filed on Apr. 21, 2009 and entitled "Substrates For Vechicle Instrument Panels and Vehicle Instrument Panels Incorporating The Same".

TECHNICAL FIELD

The present invention generally relates to finish panels for vehicles and, more specifically, to substrates for vehicle finish panels.

BACKGROUND

Vehicles may contain finish panels which are located in front of the driver and passenger seats, as well as on doors and other locations throughout the interior of the vehicle. The finish panels typically include a substrate, a skin layer, and a foam layer. The substrate may be formed from a rigid material, such as metal or rigid plastic. The skin layer, which may include a polymeric material or a natural material, such as leather, may be positioned over the substrate and foam may be injected between the substrate and the skin layer to provide the finish panel with structure. The foam may also bond the skin layer to the substrate.

The finish panels may be formed by positioning the substrate and skin layer in a mold such that the skin layer is disposed over the substrate. The mold is then closed and foam is injected between the skin layer and the substrate. In order to prevent the foam from leaking out between the substrate and the skin layer, the skin layer may be sealed to the substrate, particularly around the edges of the substrate. The seal between the skin layer and the substrate may be accomplished by utilizing the mold to apply a sealing pressure to the skin layer thereby forcing the skin against the substrate.

Some finish panels may include two or more pieces of skin, such as when different skin materials are used to cover the substrate or when different colors of the same material are used to cover the substrate. Where two or more pieces of skin are used to form the skin layer, the skin may be joined together to form a continuous skin layer. One problem that arises when using a skin layer comprising two or more pieces of skin is adequately sealing the skin layer to the substrate in the area of the seam or joint between the pieces of skin as the finish panel is formed. If the skin is not properly sealed to the substrate, foam may leak out of the skin layer and adhere to the visible surface or A-surface of the skin layer. The leakage of foam from the skin layer leads to increased material costs. Where significant foam leakage occurs, the finish panel may be discarded.

Accordingly, a need exists for alternative substrates for finish panels that facilitate sealing a two piece skin layer to the substrate during formation of the finish panel and finish panels which incorporate the same.

SUMMARY

In one embodiment, a panel substrate for a finish panel of a vehicle may include a base portion, a base sidewall, and at least one sealing surface. The base sidewall may be disposed between the base portion and the at least one sealing surface such that the at least one sealing surface and the base portion are non-coplanar. The at least one sealing surface may include an upper sealing surface and a lower sealing surface having a step configuration. When a skin layer comprising an overlap seam is disposed over the panel substrate, a lower skin of the skin layer may be positioned on the lower sealing surface such that there are no obtrusions in an A-surface of the skin layer.

In another embodiment, a finish panel for a vehicle may include a panel substrate, a skin layer disposed over the panel substrate, and a foam layer. The panel substrate may include a base portion, an upper sealing surface and a lower sealing surface. The upper sealing surface and the lower sealing surface may be oriented in a step configuration. The skin layer may include an upper skin and a lower skin joined together to form a seam. The seam may include an overlap seam and at least a portion of the overlap seam may be positioned on the lower sealing surface such that there are no obtrusions in an A-surface of the skin layer. The foam layer may be disposed between the skin layer and the panel substrate.

In yet another embodiment, a method for forming a finish panel for a vehicle comprising a panel substrate, a skin layer disposed over the panel substrate, and a foam layer positioned between the panel substrate and the skin layer may include providing a panel substrate comprising a base portion, an upper sealing surface and a lower sealing surface and a skin layer comprising an upper skin and a lower skin joined at a seam disposed between the upper skin and the lower skin. The upper sealing surface and the lower sealing surface of the panel substrate may be oriented in a step configuration while the seam of the skin layer may include an overlap seam. The panel substrate may be positioned in a first mold half and the skin layer may be positioned in a second mold half. The first mold half and the second mold half may be engaged such that the upper skin and the lower skin are disposed over the panel substrate and at least a portion of the overlap seam is positioned on the lower sealing surface of the panel substrate such that there are no obtrusions in an A-surface of the skin layer and the upper skin and lower skin are sealed to the panel substrate. A foaming material may then be injected between the substrate and the upper skin and lower skin to form the foam layer.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 3:
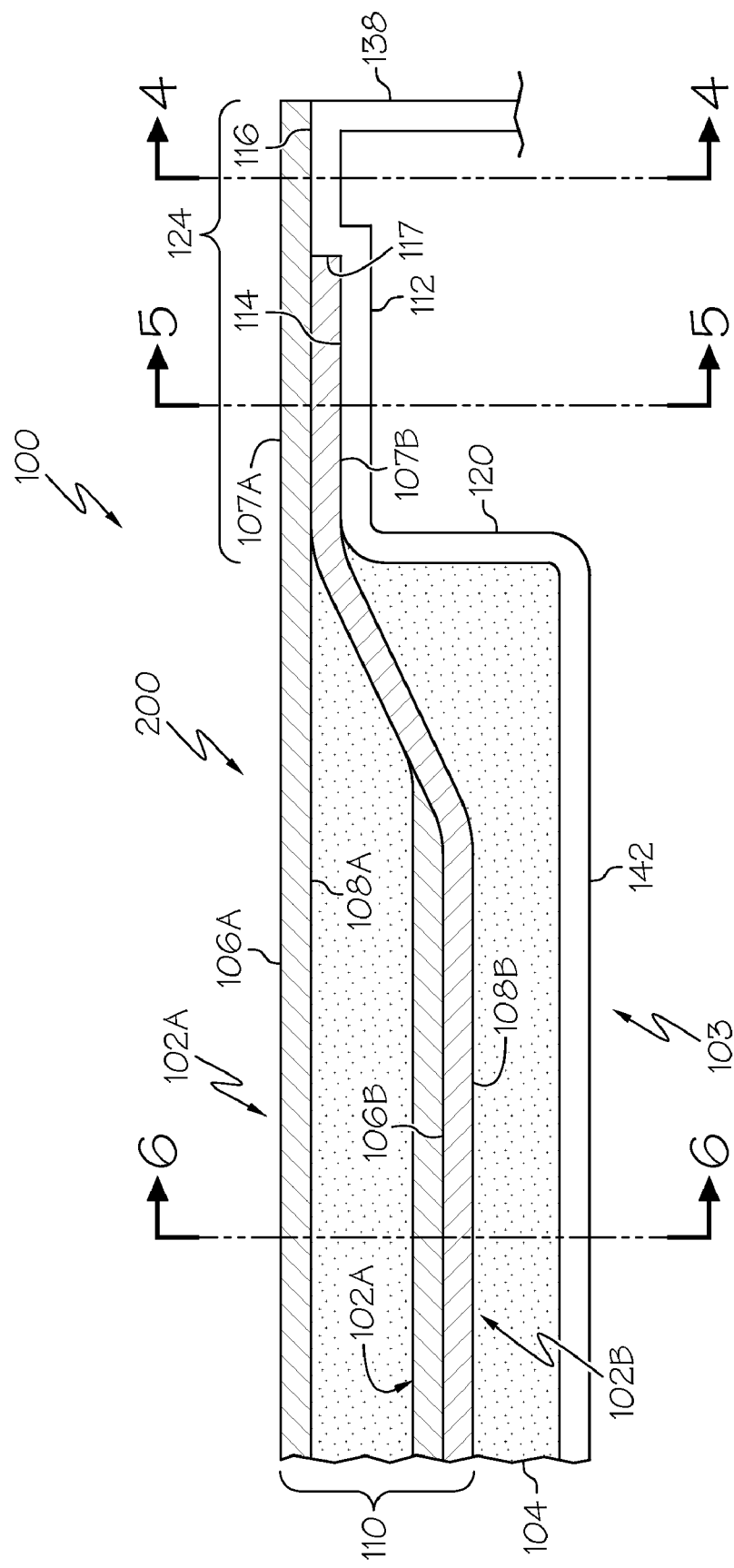
FIG. 3 depicts a partial cross section of the interior finish panel of FIG. 1 in the area indicated in FIG. 1 according to one or more embodiments shown and described herein.

FIG. 3 generally depicts a partial cross section of an interior finish panel of a vehicle according to one or more embodiments shown and described herein. The interior finish panel generally comprises a panel substrate, a foam layer and a skin layer. The panel substrate may include a base sidewall connecting a base portion of the panel substrate to a sealing surface of the panel substrate. The sealing surface may comprise an upper sealing surface and a lower sealing surface. The skin layer may comprise an upper skin and lower skin which may be joined in a skin lock over the base portion of the panel substrate. The upper and lower skin may transition out of the skin lock adjacent to the lower sealing surface and form an overlap seam which is sealed to the lower sealing surface. Positioning the overlap seam on the lower sealing surface eliminates obtrusions in the A-surface of the skin layer and facilitates improved sealing of the skin layer to the panel substrate during formation of the finish panel. The panel substrate, finish panel and methods of forming the finish panel will be described in more detail herein.

Figure 1:
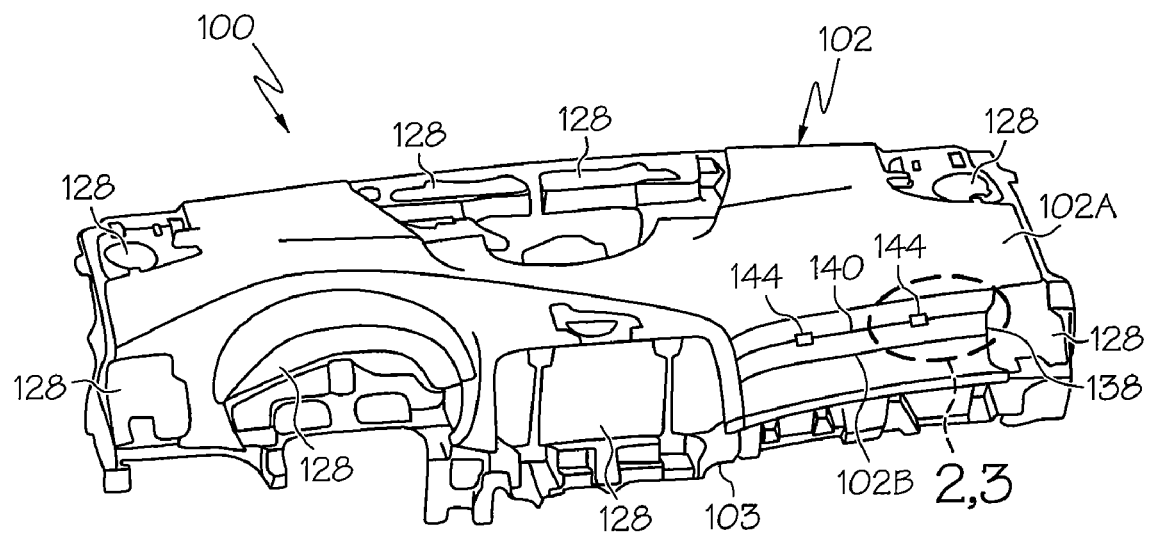
FIG. 1 depicts an interior finish panel for a vehicle according to one or more embodiments shown and described herein.

Referring now to FIG. 1, one embodiment of a finish panel 100 for a vehicle is schematically illustrated. In the embodiment shown in FIG. 1 the finish panel 100 is a front instrument panel (IP) of a vehicle which may be located in front of the passenger and driver seats of the vehicle. The finish panel 100 may generally comprise a panel substrate 103 over which a skin layer 102 may be disposed. In the embodiments shown and described herein, the skin layer 102 comprises two pieces of skin: upper skin 102A and lower skin 102B. The finish panel 100 may further comprise a foam layer (not shown) disposed between the skin layer 102 and the panel substrate to provide the finish panel 100 with the desired form and appearance. Further, the foam layer may also impart the finish panel 100 with some elasticity or resiliency such that the finish panel 100 is a "soft" finish panel. Where the finish panel 100 is an instrument panel, as shown in FIG. 1, or where the finish panel is designed to receive additional vehicle components or accessories such as, for example, gages, HVAC components, speakers, radios, navigational equipment and the like, the finish panel 100 may comprise a plurality of openings 128 for receiving such components and accessories. Accordingly, the panel substrate may be formed with various openings 128 and/or attachments points by which such components and accessories may be attached to the finish panel 100. In addition, the finish panel 100 may comprise one or more receptacles 144 for receiving connectors for attaching additional trim panels or finish accents to the finish panel 100.

While the embodiments of the finish panel 100 are shown and described herein as comprising a front instrument panel, it should be understood that the finish panel 100 may comprise various other types of finish panels which may be located throughout the vehicle. For example, the finish panel 100 may be a door panel, a console panel or other, similar finish panel located on the interior of the vehicle and which comprise a panel substrate, at least two pieces of skin, and a foam layer disposed between the panel substrate and the two pieces of skin.

Figure 2:
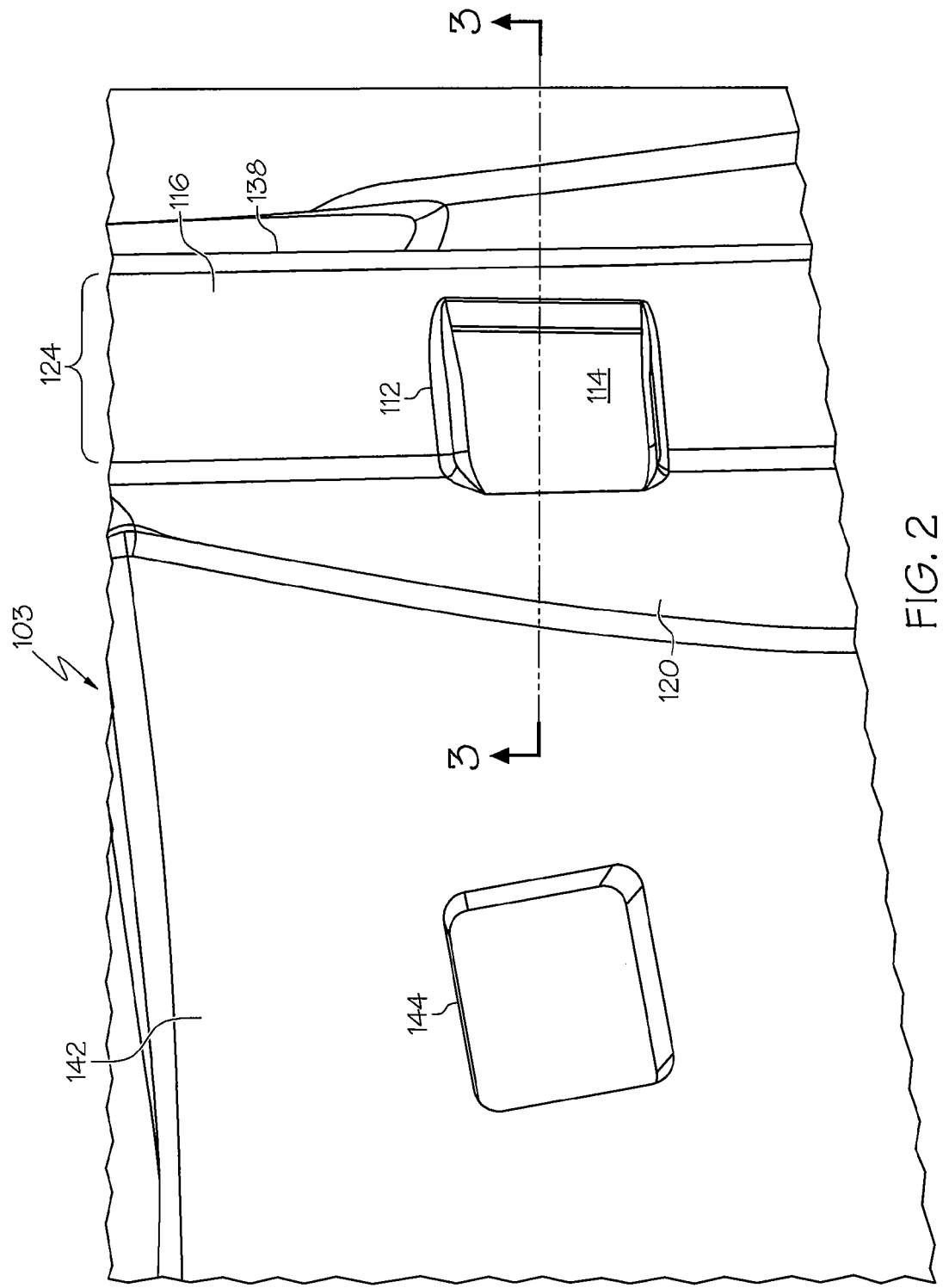
FIG. 2 depicts a portion of the panel substrate of the interior finish panel of FIG. 1 in the area indicated in FIG. 1 according to one or more embodiments shown and described herein.

Referring now to FIGS. 2 and 3, the panel substrate 103 may generally comprise a rigid material such as a rigid polymer, metal, or composite material. For example, in the embodiments shown herein, the panel substrate 103 is a rigid polymeric material such as, for example, ABS plastic, polypropylene or a similar rigid polymeric material. When the panel substrate is a rigid polymeric material, the panel substrate may be formed by injection molding the polymeric material to form the desired substrate shape and features. However, it will be understood that the panel substrate 103 may comprise a metal, such as steel sheet metal, which may be stamped to produce a panel substrate 103 having the desired substrate shape and features. Alternatively, the panel substrate 103 may comprise a composite material formed through a suitable molding process to produce a panel substrate 103 having the desired substrate shape and features.

Still referring to FIGS. 2 and 3, the panel substrate 103 may comprise a base portion 142 and at least one sealing surface 124. A base sidewall 120 may be positioned between the base portion 142 and the at least one sealing surface 124. In the embodiments shown herein the base sidewall 120 is substantially perpendicular to both the base portion 142 and the at least one sealing surface 124 such that the base portion 142 and the at least one sealing surface 124 are non-coplanar. For example, in the embodiment of the panel substrate 103 shown in FIG. 3, the base portion 142 and the sealing surface 124 are disposed in substantially parallel planes. Accordingly, it should be understood that, in one embodiment, the base portion 142 and the sealing surface 124 are substantially parallel. In another embodiment (not shown) the base portion 142 and the sealing surface 124 may be non-parallel in addition to being non-coplanar. For example, the base portion 142 may be disposed in a first plane and the sealing surface 124 may be disposed in a second plane which is non-parallel with the first plane.

While the base sidewall 120 has been described herein as being substantially perpendicular to both the base portion 142 and the at least one sealing surface 124, it should be understood that other configurations of the base sidewall 120 with the base portion 142 and the at least one sealing surface 124 may be possible.

The at least one sealing surface 124 may extend between the base sidewall 120 and an edge 138 of the panel substrate 103. The edge 138 may be an interior edge of the panel substrate (e.g., the edge 138 is located next to a receptacle formed in the panel substrate 103 for receiving an accessory, as described above, or another feature formed in the panel substrate) or an exterior edge of the panel substrate (e.g., the edge 138 is the edge of the panel substrate 103). In the embodiments shown herein, the edge 138 is an interior edge.

In the embodiments shown herein, the sealing surface 124 may comprise multiple surfaces which are non-coplanar. For example, in the embodiments shown in FIGS. 2 and 3, the sealing surface 124 comprises an upper sealing surface 116 and a lower sealing surface 114. The upper sealing surface 116 and the lower sealing surface 114 may have a step-like orientation relative to one another such that the upper sealing surface 116 and the lower sealing surface 114 are non-coplanar. In the embodiment shown in FIG. 2, the lower sealing surface 114 is disposed in a pocket 112 formed in the sealing surface 124. The pocket 112 is formed by a pair of sidewalls (e.g., a first sidewall 113 and a second sidewall 115) and the lower sealing surface 114 is disposed between the sidewalls. In one embodiment, the lower sealing surface 114 is further bounded by a third sidewall, such as back wall 117, which extends between opposed sidewalls 113, 115. As will be described in more detail herein, the pocket 112 is operable to receive an overlap seam between the upper and lower skins 102A, 102B of a skin layer disposed over the substrate, such that, when the upper skin and lower skin are sealed to the lower sealing surface 114, the A-surface extending between the skins 102A, 102B does not comprise an obtrusion due to the increased skin thickness of the overlap seam. Accordingly, the depth of the pocket 112 relative to the upper sealing surface 116, which is dictated by the height of the sidewalls 113, 115, is generally on the order of the thickness of the lower skin 102B of the skin layer 102.

While the lower sealing surface 114 is shown and described herein as being disposed in a pocket 112 formed in the sealing surface 124 of the panel substrate 103, it should be understood that the lower sealing surface 114 need not be disposed in a pocket 112. For example, in one embodiment (not shown) the upper sealing surface 116 may extend substantially along an edge of the panel substrate 103. In this embodiment, the lower sealing surface 114 may have a step configuration relative to the upper sealing surface 116, as described above, and the length of the lower sealing surface 114 may be substantially co-extensive with the upper sealing surface 116.

Referring to FIGS. 1 and 3, the finish panel 100 may comprise a skin layer 102 having at least two pieces of skin (e.g., upper skin 102A and lower skin 102B) disposed over the substrate 103. The skin layer 102 may comprise natural materials, such as leather or cloth made from natural fibers, or synthetic materials, such as vinyl, PVC, elastomeric materials such as thermoplastic urethane or similar elastomeric material(s), cloth made from synthetic fibers (e.g., nylon, etc.) or similar synthetic materials. Both the upper skin 102A and the lower skin 102B may comprise the same type of material (e.g., both the upper skin 102A and the lower skin 102B are both natural materials or both synthetic materials) or combinations of both natural materials and synthetic materials (e.g., one of the upper skin 102A and the lower skin 102B is a natural material and the other is a synthetic material). Moreover, it should be understood that the upper skin 102A and the lower skin 102B may have different colors, textures, surface finishes, etc., to achieve a desired aesthetic appearance. In the embodiments described herein, each piece of skin 102A, 102B has a top or A-surface 106A, 106B, respectively (shown in FIG. 3), which is the surface of the skin visible to an occupant of the vehicle, and an underside or B-surface 108A, 108B, respectively (shown in FIG. 3), which is the surface of the skin facing the panel substrate 103.

Referring to FIG. 3, the foam layer 104 may generally be disposed between the panel substrate 103 and the skin layer 102. The foam layer 104 may generally comprise a soft foam material which is injected between the skin layer 102 and the panel substrate 103 during formation of the finish panel 100. For example, the foam layer 104 may be injected between the skin layer 102 and the panel substrate during a foam in place (FIP) process, a low pressure molding (LPM) process, a structural reaction injection molding (SRIM) process, a vacuum forming process, or a similar process suitable for forming a finish panel. The foam material may be any material suitable for use with the aforementioned processes. For example, in one embodiment, the foam material may be a binary material comprising a polyether blend and an isocyanate component such as, for example, methylene bisphenyl isocyanate which, when reacted with the polyether blend, produces a foam material. However, it will be understood that any suitable foam material may be used with the aforementioned processes to form the finish panels described herein. The foam layer 104 generally extends between a base portion 142 of the panel substrate 103 and the B-Surface 108A, 108B of the skins 102A, 102B disposed over the panel substrate 103.

Referring to FIGS. 4-7, in order to form the finish panel 100, the upper skin 102A and the lower skin 102B are first joined together to form a skin layer 102 with a seam 140. The seam 140 may comprise at least one of three different types of joints and/or various combinations thereof. The types of joints between the upper skin 102A and the lower skin 102B may include an edge-on-edge seam 126, an overlap seam 129, or a skin lock 110.

Figure 4:
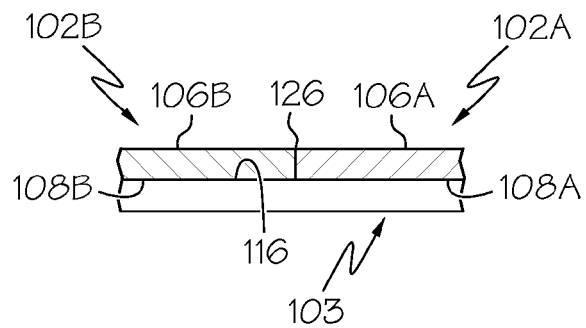
FIG. 4 depicts a partial cross section of the interior finish panel of FIG. 3 showing an edge-on-edge seam between the upper skin and the lower skin according to one or more embodiments shown and described herein.

Referring to FIG. 4, an edge-on-edge seam 126 is formed when an edge of the upper skin 102A and an edge of the lower skin 102B are abutted against one another without overlapping or otherwise intertwining the adjacent pieces of skin. When an edge-on-edge seam 126 is used to join adjacent pieces of skin, the skin in the area of the seam may be sealed to the upper sealing surface 116 of the substrate by applying a sealing pressure to the A-surface 106A, 106B of each piece of skin 102A, 102B, respectively, thereby sealing the B-surface of each skin to the upper sealing surface 116 of the panel substrate 103.

Figure 5:
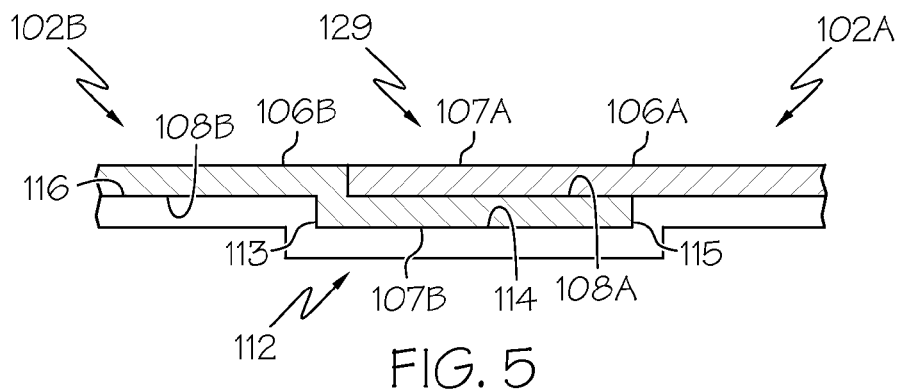
FIG. 5 depicts a partial cross section of the interior finish panel of FIG. 3 showing the lower skin disposed in a pocket in the panel substrate and the upper skin overlapping the lower skin to form an overlap seam according to one or more embodiments shown and described herein.

Referring to FIG. 5, an overlap seam 129 is formed by overlapping one edge of a piece of skin onto an adjacent piece of skin. For example, referring to FIG. 5, an overlap seam 129 is shown positioned in the pocket 112 in which the lower sealing surface 114 is disposed. In this embodiment, an upper skin overlap portion 107A of the upper skin 102A is overlapped with a lower skin overlap portion 107B of the lower skin 102B such that the B-surface 108A of the upper skin 102A is in contact with the A-surface 106B of the lower skin 102B. In this embodiment, the lower skin 102B is disposed on the lower sealing surface 114 in the pocket 112 such that, in the area of the overlap seam 129, the A-surface of the upper skin 102A does not contain any obtrusions which may adversely impact sealing the lower skin 102B to the upper skin 102A. Specifically, the lower skin 102B is disposed on the lower sealing surface 114 such that the A-surface of the lower skin 102B is flush with or slightly elevated above the upper sealing surface 116. The overlap seam 129 may be sealed to the substrate by exerting a sealing pressure to the upper skin 102A in the area of the overlap seam 129 thereby pressing the upper skin overlap portion 107A of the upper skin 102A and the lower skin overlap portion 107B of the lower skin 102B against the lower sealing surface 114 of the panel substrate 103.

Figure 6:
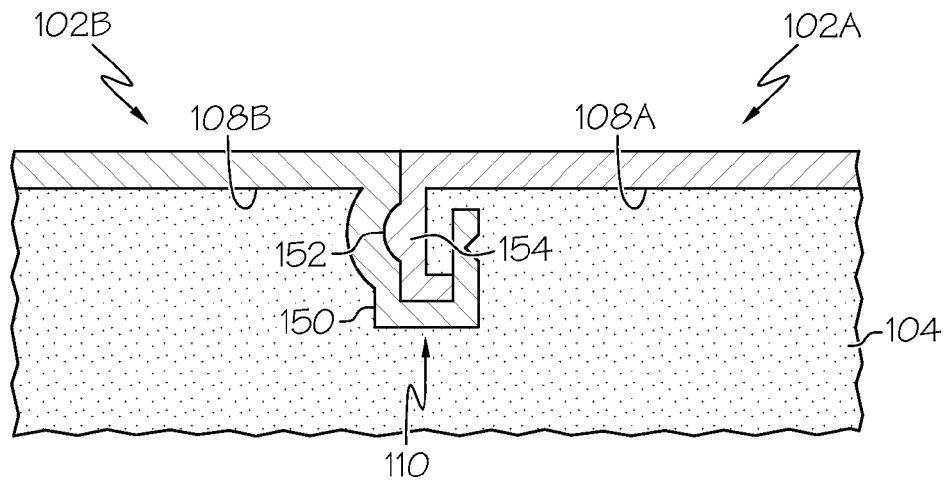
FIG. 6 depicts a partial cross section of the interior finish panel of FIG. 3 showing the upper skin and lower skin joined in a skin lock according to one or more embodiments shown and described herein.

Referring now to FIG. 6, a skin lock 110 may be formed by intertwining an edge of the upper skin 102A with an edge of the lower skin 102B such that the upper skin 102A and the lower skin 102B are joined together. While various skin lock configurations may be used, the skin lock 110 shown in FIG. 6 utilizes a U-shaped portion 150 formed in the lower skin 102B. The U-shaped portion 150 is formed with a groove 152 for receiving a corresponding bead 154 formed in the upper skin 102A. The upper skin 102A is inserted into the U-shaped portion 150 such that the bead 154 is positioned in the groove 152. The upper skin 102A and the lower skin 102B may then be joined by pressing the respective pieces of skin together along the skin lock. In one embodiment, heat may be used as the upper skin 102A and the lower skin 102B are pressed together. Alternatively or additionally, an adhesive may be disposed in the skin lock 110 to facilitate bonding and sealing the upper skin 102A with the lower skin 102B.

Figure 7:
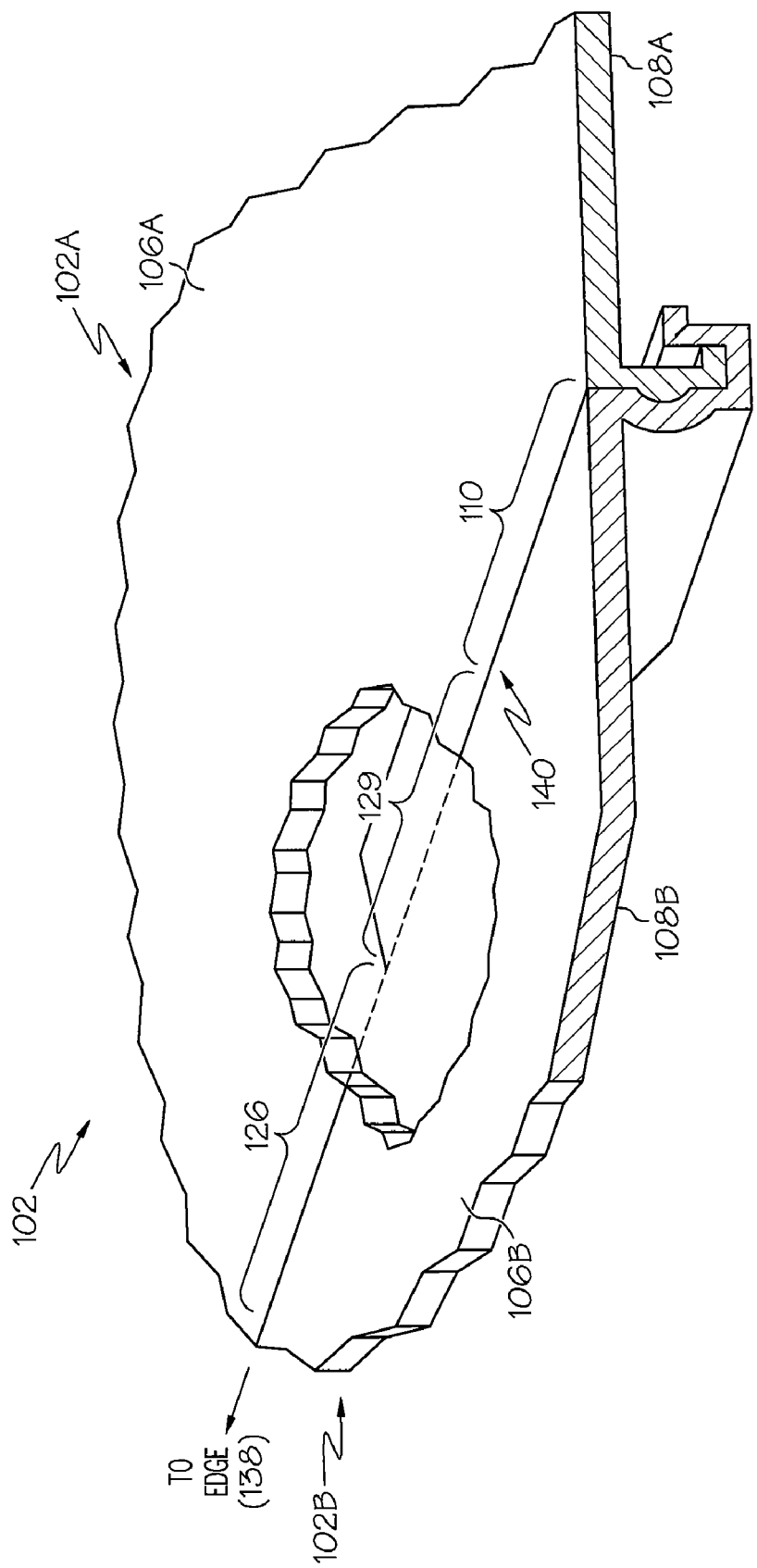
FIG. 7 depicts a portion of the seam between the upper skin and the lower skin showing a skin lock, an overlap seam and an edge-on-edge seam according to one or more embodiments shown and described herein.

Referring to FIG. 7, it should now be understood that the skin layer 102 may be formed by attaching two pieces of skin using various types of seams (e.g., edge-on-edge seams, overlap seams, and/or skin locks) to form a seam between the two pieces of skin. Further, it should be understood that the seam between the two pieces of adjacent skin may comprise an overlap seam with or without one or more other types of seams. For example, FIG. 7 shows a portion of the skin layer 102 comprising the upper skin 102A and the lower skin 102B along the seam 140. A portion of each of the upper skin 102A and the lower skin 102B is shown cut away to reveal the types of seams utilized to join the upper skin 102A and the lower skin 102B. In this embodiment, the seam 140 comprises a skin lock 110, an overlap seam 129, and an edge-on-edge seam 126. However, it should be understood that the seam 140 may comprise at least an overlap seam 129 in conjunction with a skin lock 110 and/or an edge-on-edge seam 126.

Referring now to FIGS. 3-8, after joining an upper skin 102A with a lower skin 102B to form skin layer 102, as described above and shown in FIG. 7, the skin layer 102 may be disposed over the substrate and foam may be injected between the skins 102A, 102B to provide the finish panel 100 with shape and to bond the skin layer 102 to the panel substrate 103, as will be described in more detail herein.

Figure 8:
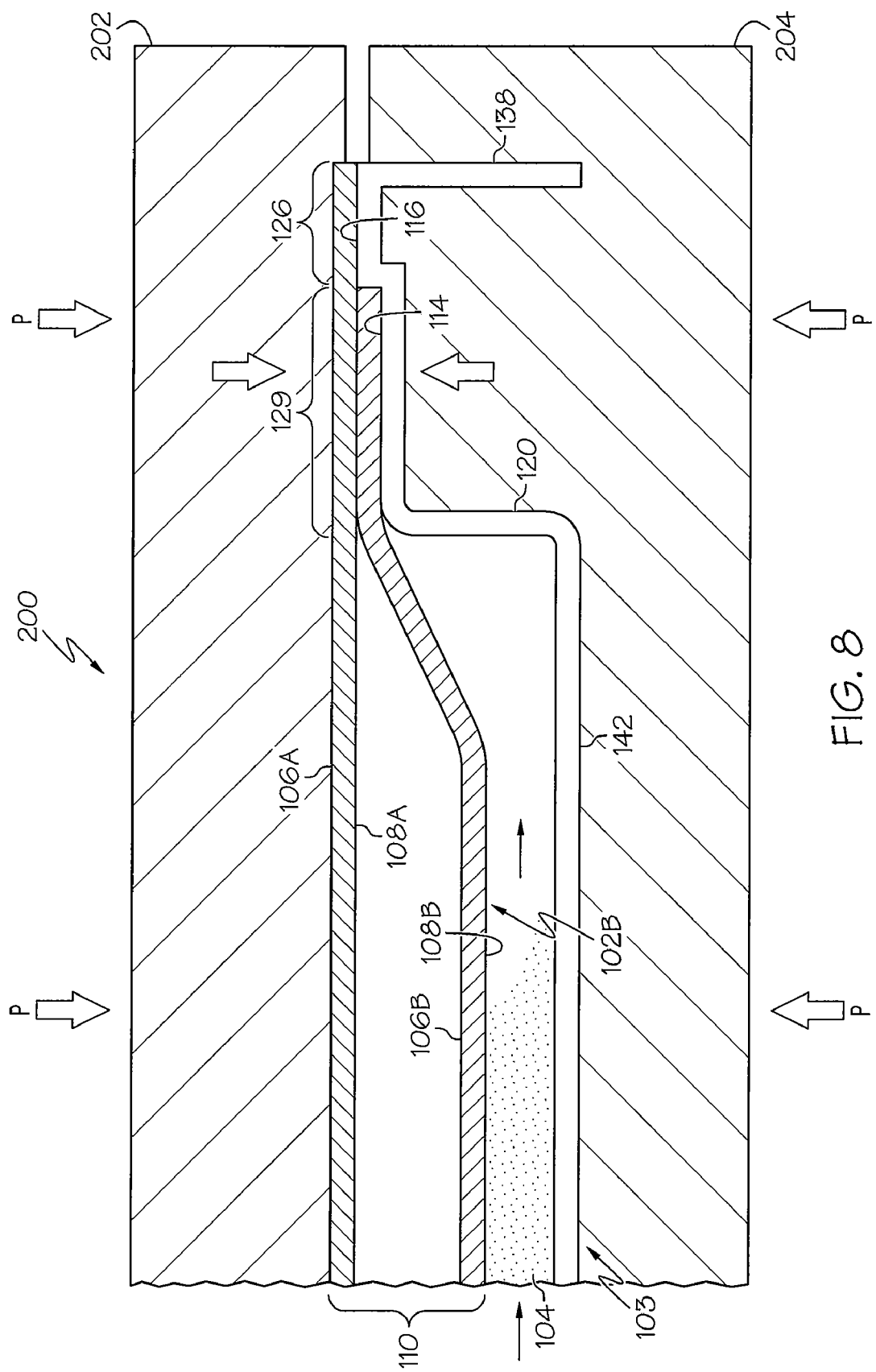
FIG. 8 depicts a cross section of a mold for forming a finish panel according to one or more embodiments shown and described herein.

Referring to FIG. 8, a partial cross section of a mold 200 is depicted which may be used to form a finish panel such as finish panel 100 shown in partial cross section in FIG. 3. In the embodiment shown in FIG. 8, the mold 200 is a clam-shell type mold which may comprise a first mold half 204 and a second mold half 202. In one embodiment, the first mold half 204 and the second mold half 202 may be pivotally attached to one another such that the first mold half 202 may be selectively engaged with the second mold half 204. Each of the first mold half 204 and the second mold half 202 may comprise one or more vacuum ports (not shown) which may be used to retain a panel substrate and a skin layer in each mold half during the forming operation.

To form the finish panel, the panel substrate 103 is positioned in the first mold half 204 and the upper skin 102A and the lower skin 102B are positioned in the second mold half 202 following seaming, as described above. The upper skin 102A and the lower skin 102B are positioned in the second mold half such that the A-surface of each piece of skin faces the second mold half 202. The first mold half 204 and the second mold half 202 are then engaged with one another such that the B-surface of each piece of skin faces the panel substrate 103 positioned in the first mold half 204, as shown in FIG. 8.

When the first mold half 204 and the second mold half 202 are engaged with one another, as shown in FIG. 8, the seam 140 between the upper skin 102A and the lower skin 102B is at least partially disposed on the lower sealing surface 114. More particularly, when the seam 140 comprises a skin lock 110 and an overlap seam 129, as described hereinabove, the skin lock 110 is disposed over the base portion 142 of the panel substrate 103 while the overlap portion is at least partially disposed on the lower sealing surface. In this embodiment, the upper skin 102A and the lower skin 102B transition out of the skin lock 110 and into an overlap seam 129 over the base portion 142 and adjacent the base sidewall 120, as shown in FIG. 8. In the overlap seam 129, the B-surface of the upper skin 102A overlaps the A-surface of the lower skin 102B. In one embodiment, the overlap seam 129 between the upper skin 102A and the lower skin 102B may be positioned in the pocket 112 such that lower skin 102B is positioned on the lower sealing surface 114, as shown in FIG. 5. When the lower skin 102B is positioned on the lower sealing surface 114 there are no obtrusions in the A-surface of the upper skin 102A in the area of the overlap seam 129 which facilitates applying a uniform sealing pressure to the skin layer 102 in the area of the overlap seam 129 which, in turn, prevents foam leakage from the seam during formation of the finish panel 100.

Further, where the seam between the upper skin 102A and the lower skin 102B further comprises an edge-on-edge seam, the upper skin 102A and the lower skin 102B may transition out of the overlap seam at the back wall 117 of the pocket 112, as shown in FIG. 8, and form an edge-on-edge seam which is positioned on the upper sealing surface 116 of the panel substrate 103, as depicted in FIG. 4.

While specific reference is made herein to the upper skin 102A and the lower skin 102B being joined at a seam comprising a skin lock, an overlap seam and a edge-on-edge seam, it should be understood that the upper skin 102A and the lower skin 102B may be joined using an overlap seam in conjunction with one or more various other types of seams, as described above.

Still referring to FIGS. 3-8, with the upper skin 102A and the lower skin 102B disposed over the panel substrate and the overlap seam at least partially disposed on the lower sealing surface 114, sealing pressure P may be exerted on the first mold half 204 and/or the second mold half 202 such that the upper skin 102A and the lower skin 102B are sealed to the panel substrate 103. For example, the lower skin 102B and the upper skin 102A are sealed to the panel substrate 103 at the lower sealing surface 114 (e.g., in the area of the overlap seam, as shown in FIGS. 3, 5 and 8). Because the lower skin 102B is positioned on the lower sealing surface 114 in the pocket 112 and the pocket 112 is of sufficient depth to receive the lower skin 102B such that the A-surface 106B of the lower skin 102B is flush with or slightly elevated above the upper sealing surface 116, no obtrusions are created in the A-surface of the skin layer 102 in the area of the overlap seam 129 when the sealing pressure P is applied. Accordingly, the sealing pressure P may be uniformly applied to the overlap seam 129 which, in turn, is effectively sealed to the lower sealing surface 114 of the panel substrate 103. Similarly, the upper skin 102A and the lower skin 102B are sealed to the upper sealing surface 116 in the area of the edge-on-edge seam 126, as shown in FIGS. 3, 4 and 8.

Once the upper skin 102A and the lower skin 102B are sealed to the panel substrate 103, a foaming material may be injected between the skin layer 102 and the panel substrate 103. The foam may flow between the skin layer 102 and the panel substrate and fills the area between the skin layer 102 and the panel substrate 103 thereby forming the foam layer 104. As the foaming material flows towards the B-surfaces 108A, 108B of the skin layer 102, the sealing pressure P uniformly applied to the overlap seam 129 prevents the foam from leaking from the overlap seam 129 and on to the A-surface 106A, 106B. As described above, the sealing pressure P may be uniformly applied to the overlap seam 129 as a result of the lower skin 102B being positioned on the lower sealing surface 114 in the pocket 112.

After the foam is injected between the skin layer 102 and the panel substrate 103, the foam is cured to form the foam layer 104. Thereafter, the upper skin 102A, lower skin 102B, panel substrate 103 and foam layer 104, now collectively finish panel 100, are removed from the mold for installation in a vehicle.

As described herein above, while specific examples shown and described herein refer to the finish panel as an instrument panel for vehicle, it should be understood that the panel substrates having the features described herein may be used to form other finish panels including, without limitation, door panels, arm rests, consoles and the like, where the finish panel comprises panel substrate, at least two pieced of skin join together at a seam, and a foam layer.

Further, it should be understood that the panel substrates described herein restrict the flow of foam to the B-surface of the skin layers disposed over the panel substrate in the area of a seam and, as such, reduce or mitigate foam leakage from the substrate. Accordingly, it will be understood that the panel substrates described herein assist in reducing material waste by reducing the amount of materials that are scrapped due to foam leakage.

For purposes of describing and defining the present invention it is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A panel substrate for a finish panel of a vehicle, the panel substrate comprising a base portion, a base sidewall, and at least one sealing surface, wherein:
the base sidewall is disposed between the base portion and the at least one sealing surface such that the at least one sealing surface and the base portion are non-coplanar; and the at least one sealing surface comprises an upper sealing surface and a lower sealing surface having a step configuration wherein, when a skin layer comprising an overlap seam is disposed over the panel substrate, a lower skin of the overlap seam is positioned on the lower sealing surface and an upper skin of the overlap seam is positioned on the upper sealing surface such that there are no obtrusions in an A-surface of the skin layer.

2. The panel substrate of claim 1 wherein the upper sealing surface and the lower sealing surface are spaced apart by an amount less than or equal to a thickness of the lower skin of the overlap seam.

3. The panel substrate of claim 1 wherein the lower sealing surface is positioned between a first sidewall and a second sidewall.

4. The panel substrate of claim 3 further comprising a third sidewall extending between the first sidewall and the second sidewall, wherein the first sidewall, the second sidewall, the third sidewall and the lower sealing surface form a pocket in the upper sealing surface.

5. The panel substrate of claim 1 wherein the upper sealing surface and the lower sealing surface are substantially parallel.

6. The panel substrate of claim 1 wherein the upper sealing surface, the lower sealing surface and the base portion are substantially parallel.

7. The panel substrate of claim 1 wherein, when a skin layer is disposed over the panel substrate, the skin layer is spaced apart from the base portion.

8. A finish panel for a vehicle comprising a panel substrate, a skin layer disposed over the panel substrate, and a foam layer, wherein:
the panel substrate comprises a base portion, an upper sealing surface and a lower sealing surface, wherein the upper sealing surface and the lower sealing surface are oriented in a step configuration;
the skin layer comprises an upper skin and a lower skin joined together to form a seam, wherein the seam comprises an overlap seam formed by an upper skin overlap portion of the upper skin and a lower skin overlap portion of the lower skin, and at least a portion of the overlap seam is positioned on the lower sealing surface such that there are no obtrusions in an A-surface of the skin layer; and
the foam layer is disposed between the skin layer and the panel substrate.

9. The finish panel of claim 8 wherein the upper sealing surface and the lower sealing surface are spaced apart by an amount less than or equal to a thickness of the lower skin.

10. The finish panel of claim 8 wherein the lower sealing surface is positioned between a first sidewall and a second sidewall.

11. The finish panel of claim 10 further comprising a third sidewall extending between the first sidewall and the second sidewall, wherein the first sidewall, second sidewall, third sidewall and lower sealing surface form a pocket in the upper sealing surface.

12. The finish panel of claim 8 wherein the seam further comprises a skin lock portion, wherein the skin lock portion is disposed over the base portion of the panel substrate and the upper skin and the lower skin transition from the skin lock portion and into the overlap seam adjacent the lower sealing surface.

13. The finish panel of claim 8 wherein the seam further comprises an edge-on-edge portion, wherein the edge-on-edge portion is positioned on the upper sealing surface of the panel substrate and the upper skin and lower skin transition from the overlap seam and into the edge-on-edge portion at the upper sealing surface.

14. The finish panel of claim 8 wherein the upper sealing surface, the lower sealing surface, and the base portion are non-coplanar.

15. The finish panel of claim 14 wherein the upper sealing surface and the lower sealing surface are substantially parallel.

16. The finish panel of claim 15 wherein the base portion and the upper sealing surface are substantially parallel.

17. A method for forming a finish panel for a vehicle comprising a panel substrate, a skin layer disposed over the panel substrate, and a foam layer positioned between the panel substrate and the skin layer, the method comprising: providing the panel substrate comprising a base portion, an upper sealing surface and a lower sealing surface, wherein the upper sealing surface and the lower sealing surface are oriented in a step configuration; positioning the panel substrate in a first mold half; providing the skin layer comprising an upper skin and a lower skin joined at a seam disposed between the upper skin and the lower skin, wherein the seam comprises an overlap seam; positioning the skin layer in a second mold half; engaging the first mold half with the second mold half such that the upper skin and the lower skin are disposed over the panel substrate and at least a portion of the overlap seam is positioned on the lower sealing surface of the panel substrate such that there are no obtrusions in an A-surface of the skin layer and the upper skin is sealed to the upper sealing surface of the panel substrate and the lower skin is sealed to the lower sealing surface of the panel substrate; and injecting a foaming material between the panel substrate and the upper skin and the lower skin to form the foam layer.

18. The method of claim 17 wherein the seam further comprises a skin lock portion, wherein the skin lock portion is disposed over the base portion of the panel substrate and the upper skin and lower skin transition from the skin lock portion and into the overlap seam adjacent the lower sealing surface.

19. The method of claim 17 wherein the seam further comprises an edge-on-edge portion, wherein the edge-on-edge portion is positioned on the upper sealing surface of the panel substrate and the upper skin and lower skin transition from the overlap seam into the edge-on-edge portion at the upper sealing surface.

20. The method of claim 17 wherein the upper sealing surface and the lower sealing surface are spaced apart by an amount less than or equal to a thickness of the lower skin.

\* \* \* \* \*